(12) United States Patent
Huttemann

(10) Patent No.: US 7,140,120 B1
(45) Date of Patent: Nov. 28, 2006

(54) TILE MEASURING DEVICE

(76) Inventor: Christopher Huttemann, 16626 S. 38th Way, Phoenix, AZ (US) 85048

( * ) Notice: Subject to any disclaimer, the term of this patent is extended or adjusted under 35 U.S.C. 154(b) by 0 days.

(21) Appl. No.: 11/175,455

(22) Filed: Jul. 6, 2005

(51) Int. Cl.
   *G01B 5/20* (2006.01)
(52) U.S. Cl. .................................. 33/526; 33/27.01
(58) Field of Classification Search ............... 33/23.01, 33/23.05, 27.01, 27.12, 42, 43, 44, 526, 527
   See application file for complete search history.

(56) References Cited

U.S. PATENT DOCUMENTS

| | | | |
|---|---|---|---|
| 923,875 A | 1/1909 | McDonald | |
| 1,141,640 A | 6/1915 | Huguenin | |
| 2,519,508 A | 8/1950 | Schnorbus | |
| 2,795,854 A * | 6/1957 | Perkal | .......................... 33/527 |
| 3,678,587 A | 7/1972 | Madden | |
| 4,827,625 A * | 5/1989 | Le Moal | ....................... 33/527 |
| 5,188,013 A | 2/1993 | Cardinale | |
| 5,560,116 A | 10/1996 | Tobia | |
| 6,347,459 B1 * | 2/2002 | Schmitt | ....................... 33/526 |
| 2003/0033724 A1 | 2/2003 | Barbosa | |
| 2003/0159301 A1 | 8/2003 | Lawson | |
| 2006/0123648 A1 * | 6/2006 | Bailey | .......................... 33/526 |

FOREIGN PATENT DOCUMENTS

GB            2185115 A   *   7/1987    .................. 33/527

* cited by examiner

*Primary Examiner*—G. Bradley Bennett
(74) *Attorney, Agent, or Firm*—Parsons & Goltry; Robert A. Parsons; Michael W Goltry

(57) ABSTRACT

A tile measuring device includes a reference bar member having a bottom side with a gap gauge extending therefrom. A plurality of shafts extends through the reference bar member and terminating in a flexible contact bar conformable to an obstruction. Each shaft of the plurality of shafts is independently slidable through the reference bar member and held in position by a brake mechanism.

17 Claims, 7 Drawing Sheets

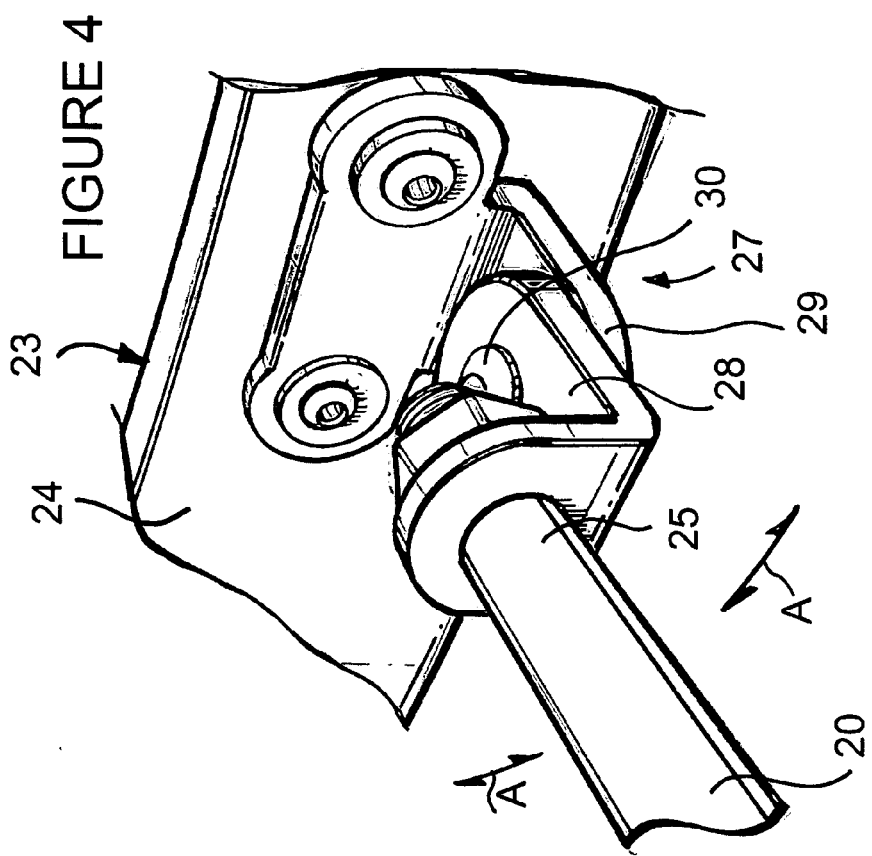
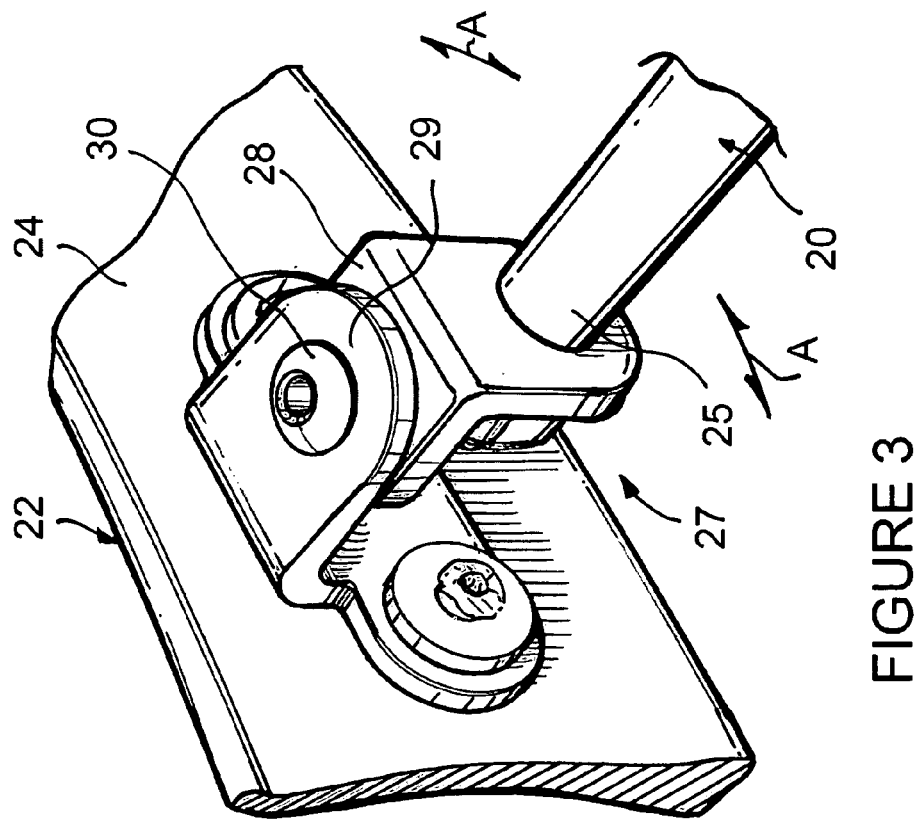

TILE MEASURING DEVICE

FIELD OF THE INVENTION

This invention relates to tools for the laying of tiles.

More particularly, the present invention relates to devices for measuring tiles.

BACKGROUND OF THE INVENTION

It has long been appreciated, particularly by those skilled in the art of flooring installation, that careful measuring is required during the installation of tiles. While tiles are of fixed dimensions and shape, the surfaces upon which they are laid very seldom are. This typically results in a need to cut tiles, changing their dimensions for placement in specific areas such as at the edges of rooms and the like. There are a multitude of devices employed for measuring tiles to be cut. These operate in almost as many different ways as there are devices. Typically, these devices permit a distance to be measured from the edge of a laid tile to a wall or other obstruction. This measurement can then be employed to cut a tile to fit. These devices are generally effective, but have a number of drawbacks that can reduce efficiency, increase wasted time and materials and cause a great deal of frustration.

When tiles are laid, regardless of the material employed, a space is often left which is later filled with grout. These spaces between tiles need to be uniform to provide an aesthetically pleasing affect. Thus, when measuring the distance between the wall and the laid tile, this space must be added into the calculation. Often overlooked, this error can result in miss-cut tiles and wasted time. Also, in many modern buildings curved walls are being employed. This prevents the use of many measuring devices.

It would be highly advantageous, therefore, to remedy the foregoing and other deficiencies inherent in the prior art.

Accordingly, it is an object of the present invention to provide a new and improved tile measuring device.

Another object of the present invention is to provide a measuring device which will allow tracing of curves.

Yet another object of the present invention is to provide a measuring device which will accommodate tile spacing.

SUMMARY OF THE INVENTION

Briefly, to achieve the desired objects of the present invention in accordance with a preferred embodiment thereof, provided is a tile measuring device including a reference bar member having a bottom side, a plurality of shafts extending therethrough and terminating in a flexible contact bar. Each shaft of the plurality of shafts is independently slidable through the reference bar member. A gap gauge is carried by the bottom side of the reference bar member.

In a further aspect of the invention, provided is a tile measuring device including a reference bar member having a bottom side, a top side, a front side, and a rear side. A plurality of shafts extends through the reference bar member from the rear side to the front side and each shaft is independently reciprocally movable therethrough. Each shaft of the plurality of shafts includes a first end and a second end. A flexible contact bar having a front surface and a rear surface is provided. The first end of each shaft of the plurality of shafts is coupled to the rear surface of the flexible contact member. A braking mechanism releasably locks the plurality of shafts into position relative the reference bar member. A gap gauge is carried by the bottom side of the reference bar member.

In yet further aspects of the invention, the gap gauge is removably attached to the bottom side of the reference bar member. The gap gauge can include a flat vertical surface on a first side and a stepped surface on a second, opposing side. The first end of each shaft of the plurality of shafts can be coupled to the rear surface of the flexible contact member by a pivoting coupling. Additionally, each shaft of the plurality of shafts has a second end which can be coupled together by a compliant coupling member.

Also provided is a method of measuring a tile including the steps of providing a laid tile having an edge, and a space between the edge of the laid tile and an obstruction, and providing a tile measuring device according the present invention. The tile measuring device provided includes a reference bar member having a bottom side, a top side, a front side, and a rear side. A plurality of shafts extends through the reference bar member from the rear side to the front side and each shaft is independently reciprocally movable therethrough. Each shaft of the plurality of shafts includes a first end and a second end. A flexible contact bar has a front surface and a rear surface, the first end of each shaft of the plurality of shafts being coupled to the rear surface of the flexible contact member. A braking mechanism is movable between a locked orientation for locking the plurality of shafts into position relative the reference bar member and an unlocked orientation for allowing reciprocal movement of the plurality of shafts relative the reference bar member. A gap gauge is carried by the bottom side of the reference bar member and has a rearward surface and a forward surface. The tile measuring device is positioned with the rearward surface of the gap gauge against the edge of the laid tile. Each shaft of the plurality of shafts is moved forwardly until the flexible contact member presses against and conforms to the obstruction. The braking mechanism is then moved to the locked orientation.

In a further aspect of the method, the tile measuring device is removed from the laid tile. The tile measuring device is then positioned over a tile to be cut with the forward surface of the gap gauge residing against an edge thereof. The flexible contact member is then used as a tracing guide on the tile to be cut.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 3 is a top perspective view of a portion of a pivotal coupling;

FIG. 4 is a bottom perspective view of a portion of a pivotal coupling;

DETAILED DESCRIPTION OF THE PREFERRED EMBODIMENT

Figure 1:
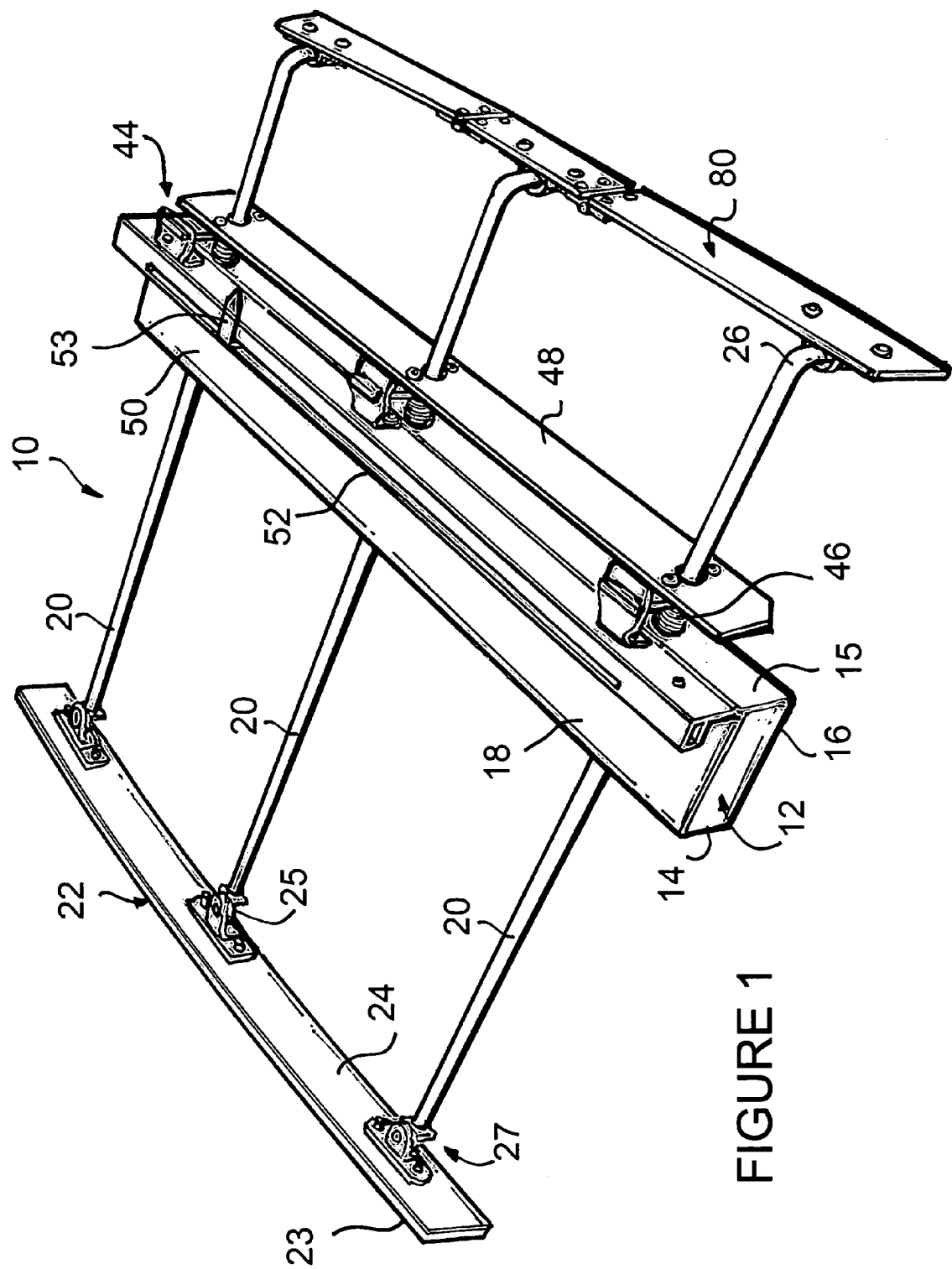
FIG. 1 is a perspective view of the tile measuring device according to the present invention.
Figure 2:
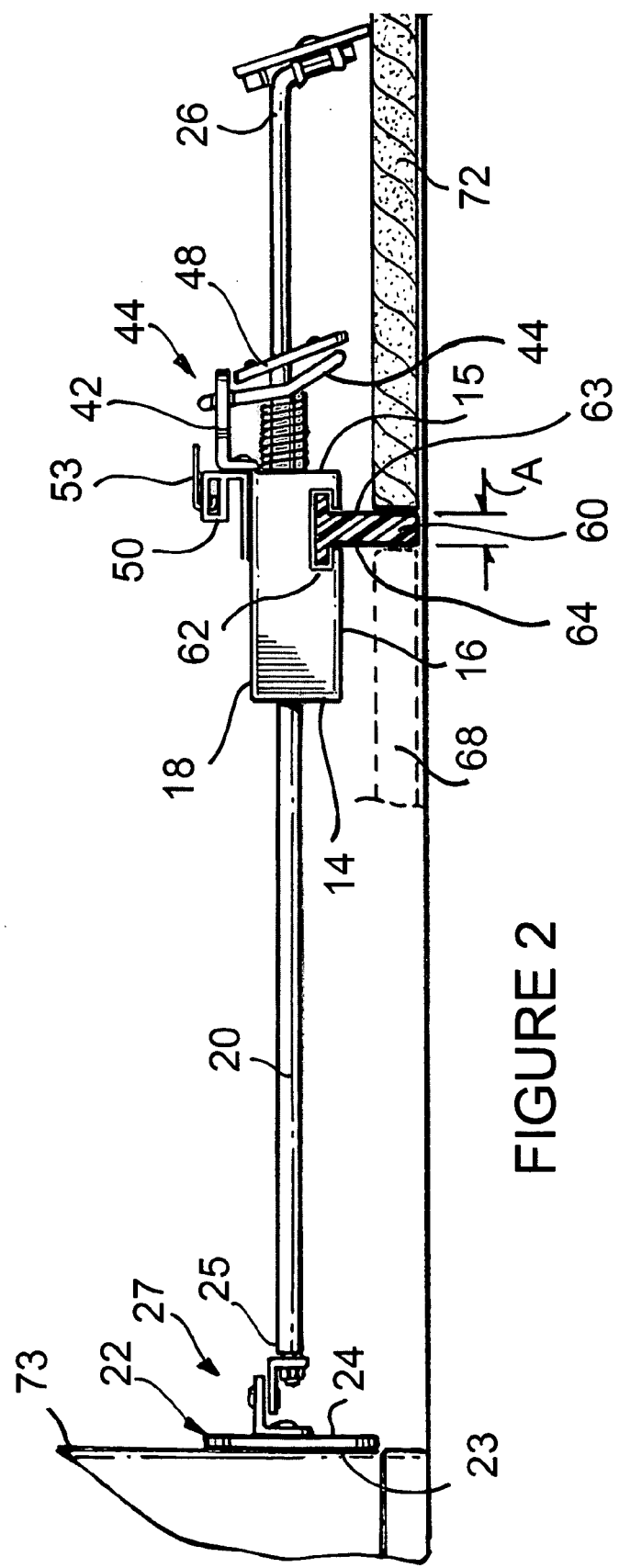
FIG. 2 is a side view of the tile measuring device as it appears in position to measure a space.

Turning now to the drawings in which like reference characters indicate corresponding elements throughout the several views, attention is first directed to FIGS. 1 and 2 which illustrate a tile measuring device generally designated 10. Tile measuring device 10 includes a reference bar member 12 having a front side 14, a rear side 15, a bottom side 16 and a top side 18. For purposes of orientation, the term front or forward is intended to indicate a direction toward an obstruction such as a wall against which a measurement is to be taken. Reference bar member 12 is an elongated member having a length sufficient to accommodate tiles of the desired size. It will be understood, that small tiles as well as large tiles can be measured with tile measuring device 10 using a reference bar member 12 of sufficient length to accommodate larger tiles. Accommodating smaller tiles on a measuring device 10 having any reference bar member 12 able to accommodate large tiles will be described presently. Reference bar member 12 may be fabricated of any material sufficiently rigid to maintain its shape, including wood metal plastic, and the like.

A plurality of shafts, three shafts 20 in this embodiment, extend through reference bar member 12 from rear side 15 to front side 14, and each terminates in a flexible contact bar 22. Flexible contact bar 22 is an elongated flexible member having a planar front surface 23 and a rear surface 24. The term "flexible" in this application is intended to indicate a material which will generally hold its shape to act as a tracing edge, but can be deformed as desired in a manner which will be described presently. Many different metals or plastics can be used to provide the desired characteristics for use as flexible contact bar 22. As will become apparent to those skilled in the art from the following description, planar front surface 23 of flexible contact bar 22 is generally flat to be received against an obstruction to which a tile is to be measured.

In this embodiment, three shafts 20 are employed, each having an end 25 coupled to rear surface 24 of flexible contact bar 22, and an opposing end 26. As can be seen, end 25 is positioned forwardly of reference bar member 12 and opposing end 26 is positioned rearwardly of reference bar member 12. Shafts 20 are generally equally spaced along a length of reference bar member 12 to support and position flexible contact bar 22 relative reference bar member 12. Flexible contact bar 22 has a length substantially matching the length of reference bar member 12 although variations can occur. It will be understood by those skilled in the art that two or more shafts 20 may be employed.

With additional reference to FIGS. 3 and 4, each shaft 20 is pivotally coupled to flexible contact bar 22. In the preferred embodiment, a pivoting coupling 27 is employed consisting of an L-shaped bracket 28 coupled to and extending horizontally from end 25, and an L-shaped bracket 29 coupled to and extending horizontally from rear surface 24 of flexible contact bar 22. A pivot pin 30 is journaled concurrently through L-shaped bracket 28 and L-shaped bracket 29, permitting pivoting of the juncture between shafts 20 and flexible contact bar 22 in a direction indicated by double arrowed lines A. It will be understood by those skilled in the art that various other coupling mechanisms can be employed to permit relative movement between flexible contact bar 22 and each shaft 20.

Figure 5:
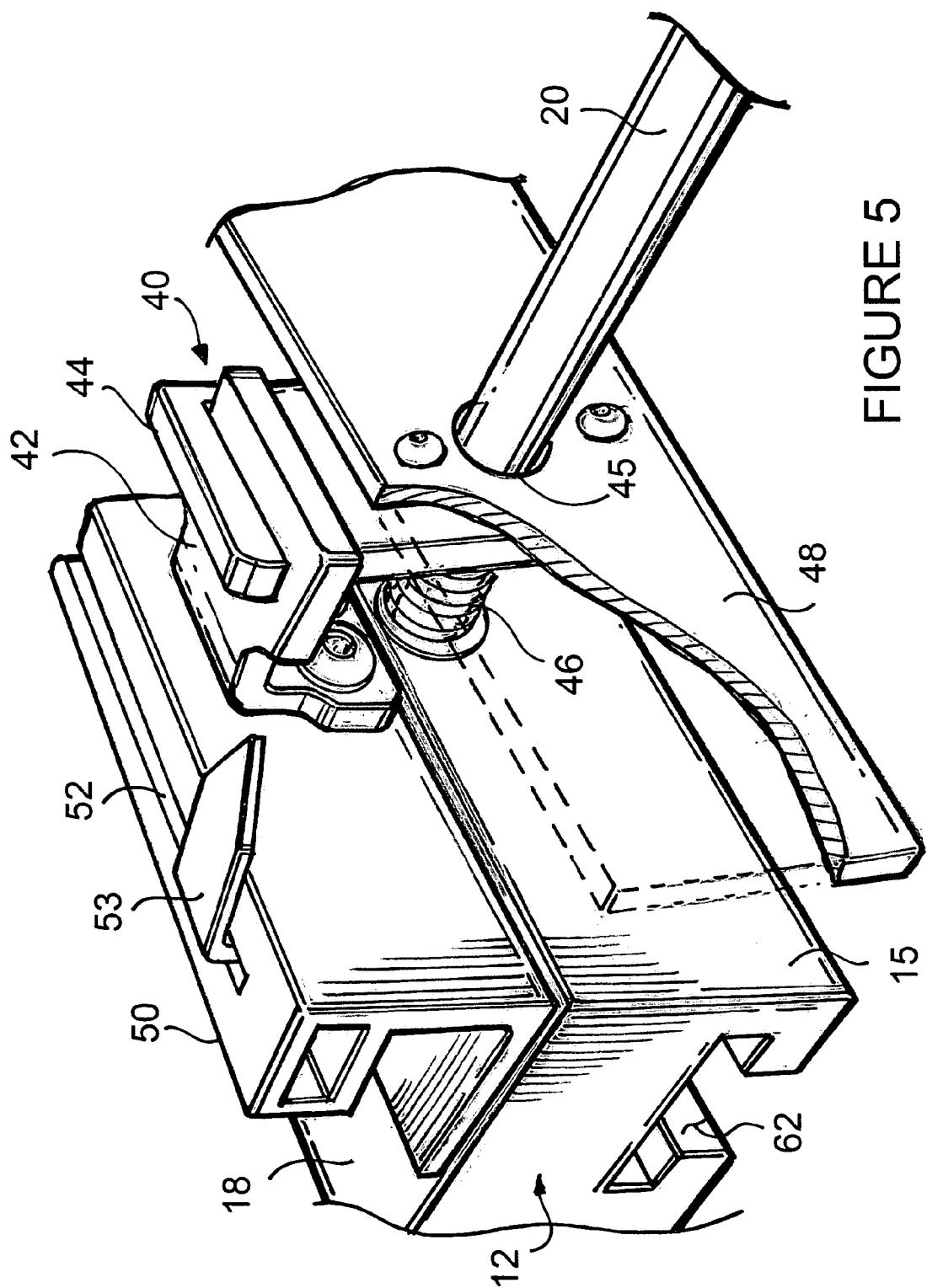
FIG. 5 is an enlarged sectional view in perspective, of a portion of the brake mechanism.

Still referring to FIGS. 1 and 2, with additional reference to FIG. 5, the extension and retraction of shafts 20 through reference bar member 12 is controlled by a braking mechanism 40. Braking mechanism 40 is movable between a locked orientation and an unlocked orientation. In the locked orientation, braking mechanism 40 locks shafts 20 in position relative reference bar member 12. In the unlocked orientation, braking mechanism 40 releases shafts 20, permitting reciprocating movement of shafts 20 through reference bar member 12. In this embodiment, braking mechanism 40 includes a plurality of support brackets 42 coupled to and extending from rear side 15 of reference bar member 12. A friction brake plate 44 having an aperture 45 formed therethrough, is pivotally carried by each support brackets 42 and is movable between a forward or unlocked position and a rearward or locked position. Each shaft 20 extends through aperture 45 of a corresponding one of friction brake plates 44. In the forward or unlocked position, each friction brake plate 44 is moved forwardly toward rear side 15 of reference bar member 12, disengaging shafts 20 and permitting free reciprocating movement thereof. In the rearward or locked position, each friction brake 44 is moved rearwardly away from rear side 15 of reference bar member 12, engaging shafts 20 and preventing free reciprocating movement thereof.

Braking mechanism 40 further includes biasing mechanisms for biasing friction brake plates 44 into the locked position. In this preferred embodiment, the biasing mechanism consists of compression springs 46 carried by each shaft 20 intermediate rear side 15 and each friction brake plate 44. Movement of friction brake plates 44 to the unlocked position must overcome the bias of compression springs 46. This can be accomplished by providing a trigger bar 48 carried by shafts 20 and positioned to press upon a lower edge of each friction brake plate 44 when actuated by a user. In this manner, each friction brake plate 44 can be moved to the unlocked position at the same time. It will be understood by those skilled in the art, that while each friction brake plate 44 is an individual elements in the present embodiment, they can be formed as a single bar extending substantially the length of reference bar member 12. In this instance, moving friction brake plate 44 to the unlocked position can be accomplished by moving a lower edge thereof forwardly. Other braking mechanisms will occur to those skilled in the art, for preventing and allowing movement of shafts 20 through reference bar member 12. It is intended that these braking mechanisms such as locking screws or clamps can also be employed in the present invention.

Figure 8:
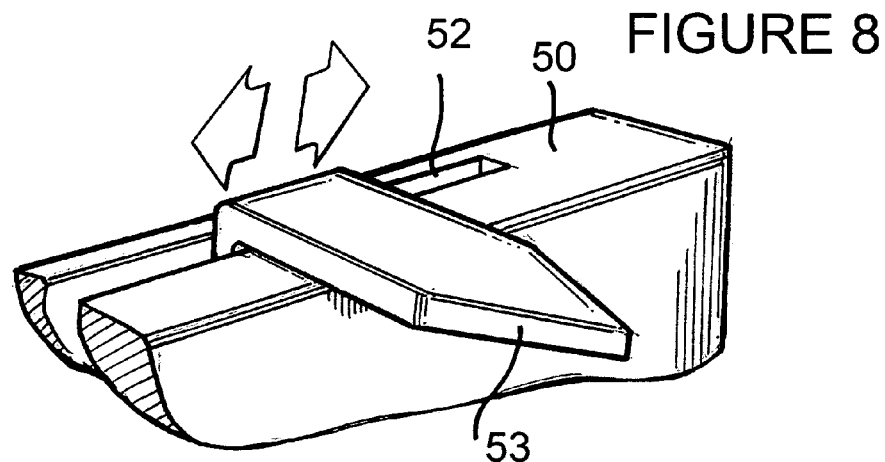
FIG. 8 is an enlarged partial view of a track carrying a marker.

Reference bar member 12 further includes a support 50 coupled to top side 18 thereof and extending substantially its entire length. With additional reference to FIG. 8, support 50 has a track 52 carrying a marker 53. Support 50 is intended to be included as a part of reference bar member 12 and forms part of the rear side 15 to which support brackets 42 are attached. It will be understood that while support 50 is employed in the present embodiment, reference bar member 12 can be formed with a higher profile to allow attachment of brake mechanism 40 directly thereto and have track 52 formed in the upper side thereof for carrying marker 53. The purpose of marker 53 will be described presently.

Figure 6:
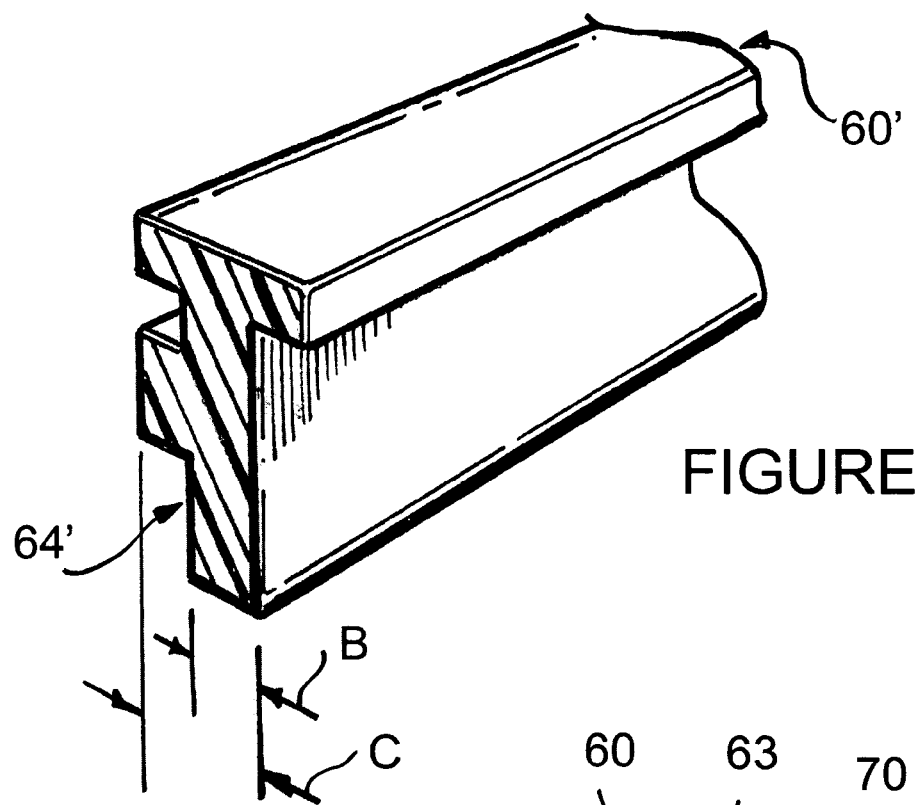
FIG. 6 is an enlarge perspective view of a section of a gap gauge according to the present invention.

Referring to FIGS. 2 and 5, tile measuring device 10 includes a gap gauge 60 extending from bottom side 16 of reference bar member 12. A slot 62 having a T-shaped cross-section is formed in bottom side 16 for receipt of gap gauge 60. Slot 62 to extend substantially the entire length of reference bar member 12, with gap gauge 60 also substantially extending the entire length thereof. Gap gauge 60 includes a planar rear surface 63 and a front surface 64. In an additional embodiment of a gap gauge 60', a front surface 64' can be stepped as illustrated in FIG. 6 instead of planar as in the embodiments of FIGS. 2 and 7. Gap gauge 60 has a width between rear surface 63 and front surface 64 of the desired spacing between tiles as indicated by reference characters A in FIGS. 2 and 7. This width can be any spacing, such as ½, ¼, and ⅜ inch and the like. With respect to gap gauge 60', a multiple step gauge measurement is present as indicated by reference characters B and C on FIG. 6. Thus, multiple spacing gaps can be measured with the same gap gauge. Gap gauge 60 is removable in the present embodiment, to allow for a single or multiple step gauge to be installed. One skilled in the art will understand that gap gauge 60 may be integrally formed with bottom side 16 of reference bar member 12. When integrally formed, gap gauge 60 is limited to either a set single or a set multiple gauge, and cannot be traded out for another.

Figure 7:
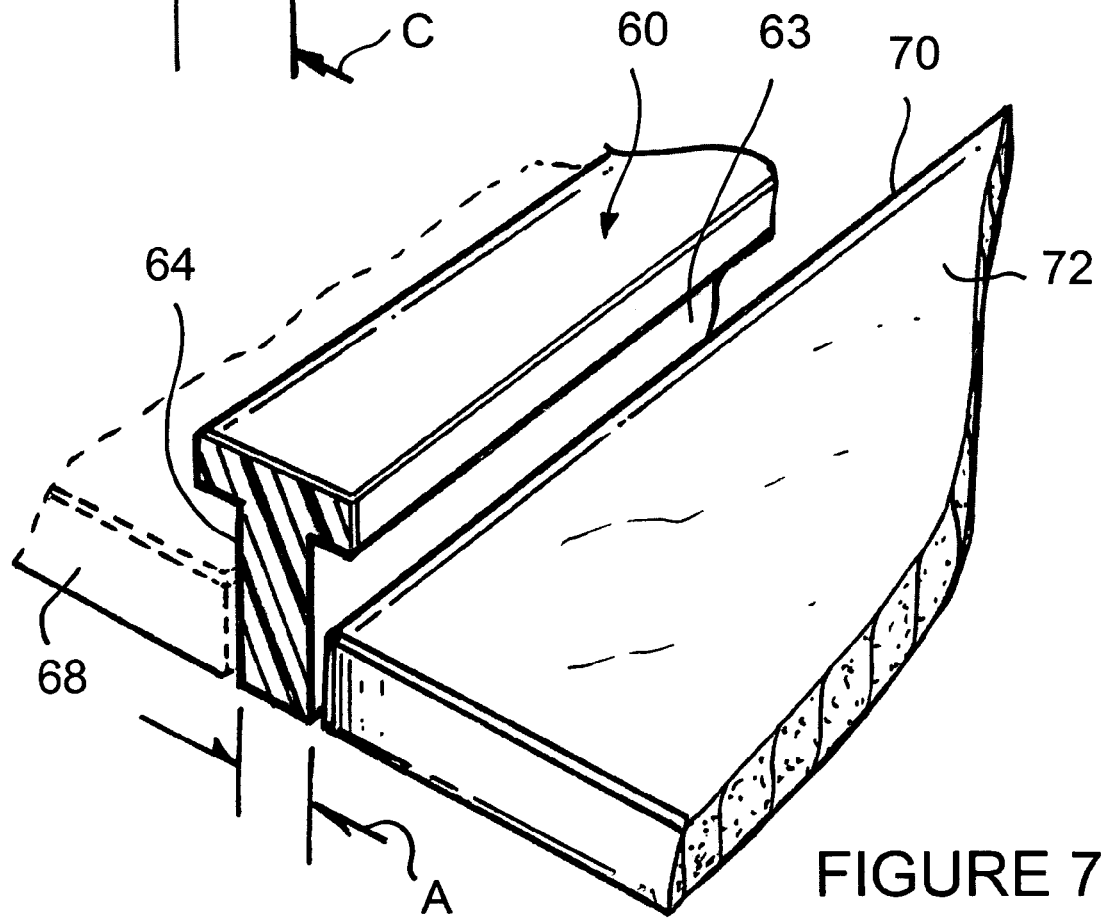
FIG. 7 is an enlarged partial view in perspective, illustrating the positioning of a gap gauge.
Figure 9:
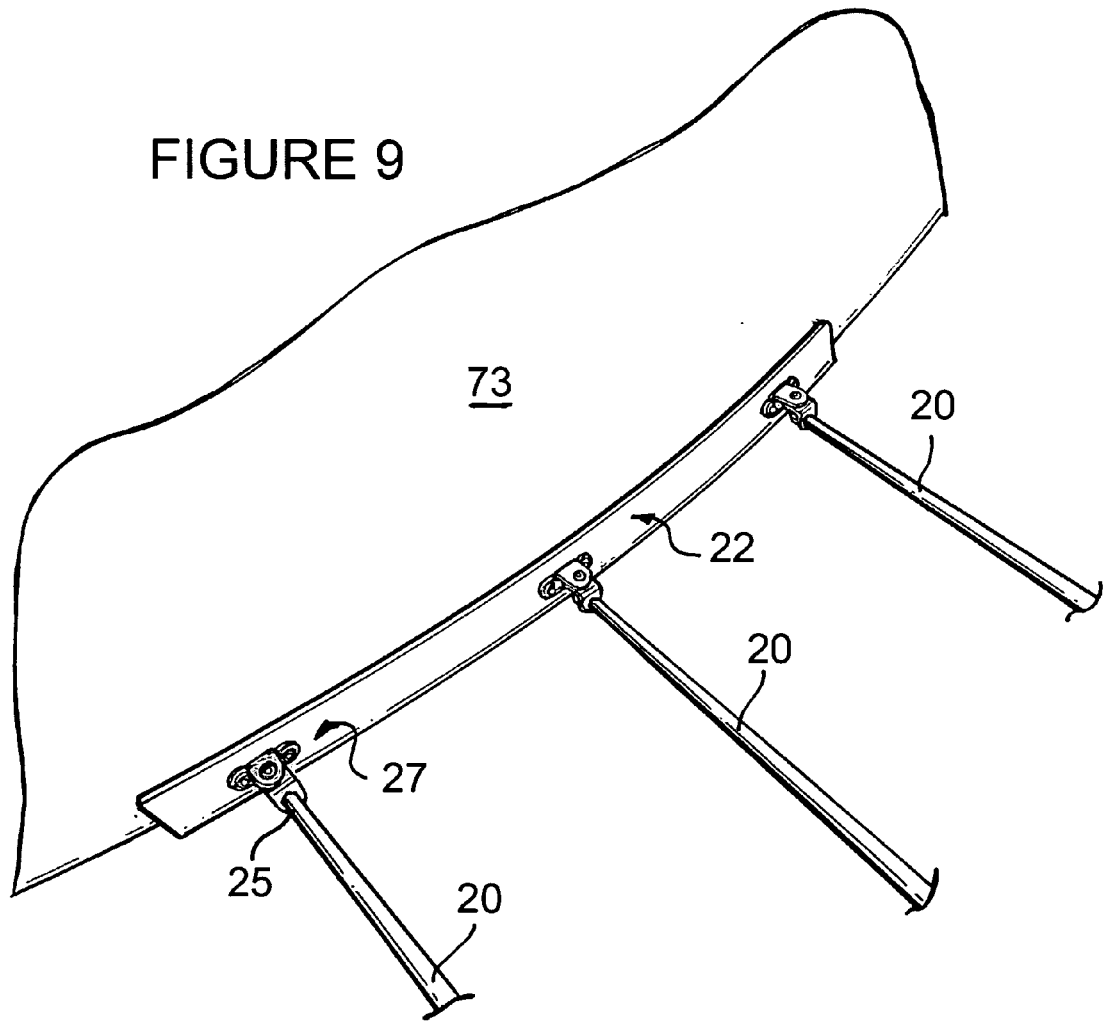
FIG. 9 is a perspective view of a flexible contact bar conforming to an obstruction.

Turning out to FIGS. 2 and 7, tile measuring device 10 is employed to measure a space between an edge 70 of a laid tile 72 and an obstruction such as wall 73. Once the space is measured, tile measuring device 10 is positioned on a tile to be cut 68 and an instrument is used to scribe tile to be cut 68, marking a cut line. When cut, the tile can then be laid in position. Operation of tile measuring device 10 includes positioning rear surface 63 of gap gauge 60 against edge 70 of laid tile 72. Brake mechanism 44 is then moved to the unlocked position and shafts 20 are moved forwardly through reference bar member 12 consequently moving flexible contact bar 22 against wall 73. With additional reference to FIG. 9, flexible contact bar 22 will contour to the curve of wall 73. A smooth curvature of flexible contact bar 22 is permitted by the pivotal movement of pivoting couplings 27. With flexible contact bar 22 flush against wall 73, locking mechanism 44 is allowed to move or is moved to the locked position securing shafts 20 relative reference bar member 12. Tile measuring device 10 can now be moved as desired since flexible contact bar 22 is locked in position relative reference bar member 12.

Tile measuring device 10 can now be positioned over tile to be cut 68 with front surface 64 positioned against a rearward edge of tile to be cut 68. In this position, flexible contact bar 22, being held in the position corresponding to wall 73, can be employed as a tracing edge for tracing a cut line on tile to be cut 68. When a multiple step gauge such as 60' is employed, the desired step of front surface 64' can be selected to provide the desired spacing. In this process, gap gauge 60 acts to inherently compensate and provide for a space of the desired width between tiles. Since shafts 20 are each individually movable through reference bar member 12, flexible contact bar 22 can be molded to a large variety of curves, ripples, straight walls, and the like. This measurement can then be easily transferred to the tile being cut.

To facilitate the use of tile measuring device 10, shafts 20 may be coupled at rearward ends 26 by a compliant coupling member 80. Compliant coupling member 80 permits, for example, a central shaft 20 to be moved in either a forward or direction, and urges the remaining shafts 20 to move in a like manner without the requirement of individually moving each shaft 20. Compliance of compliant coupling member 80 is provided since each shafts may be moved forwardly a different distance in order for flexible contact bar 22 to mold to an obstruction. Compliance may be provided by using a flexible material such as that used in flexible contact bar 22, or, as illustrated in FIG. 1, a multiple piece hinged element can be employed. Since compliant coupling member 80 need not match the shape of an obstruction, but need only adapt to different positions of ends 26 of shafts 20, a wider variety of mechanisms may be employed.

Figure 10:
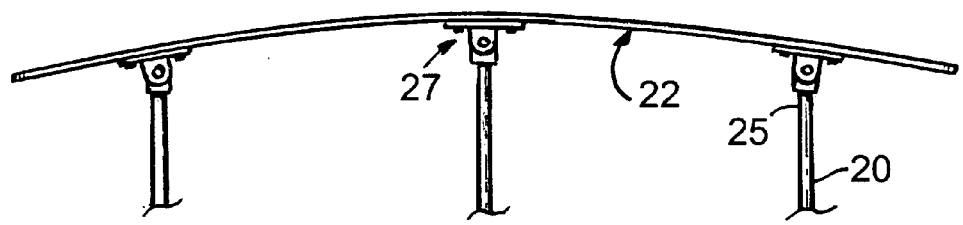
FIG. 10 is a top view of the flexible contact bar of the tile measuring device of FIG. 1.
Figure 11:
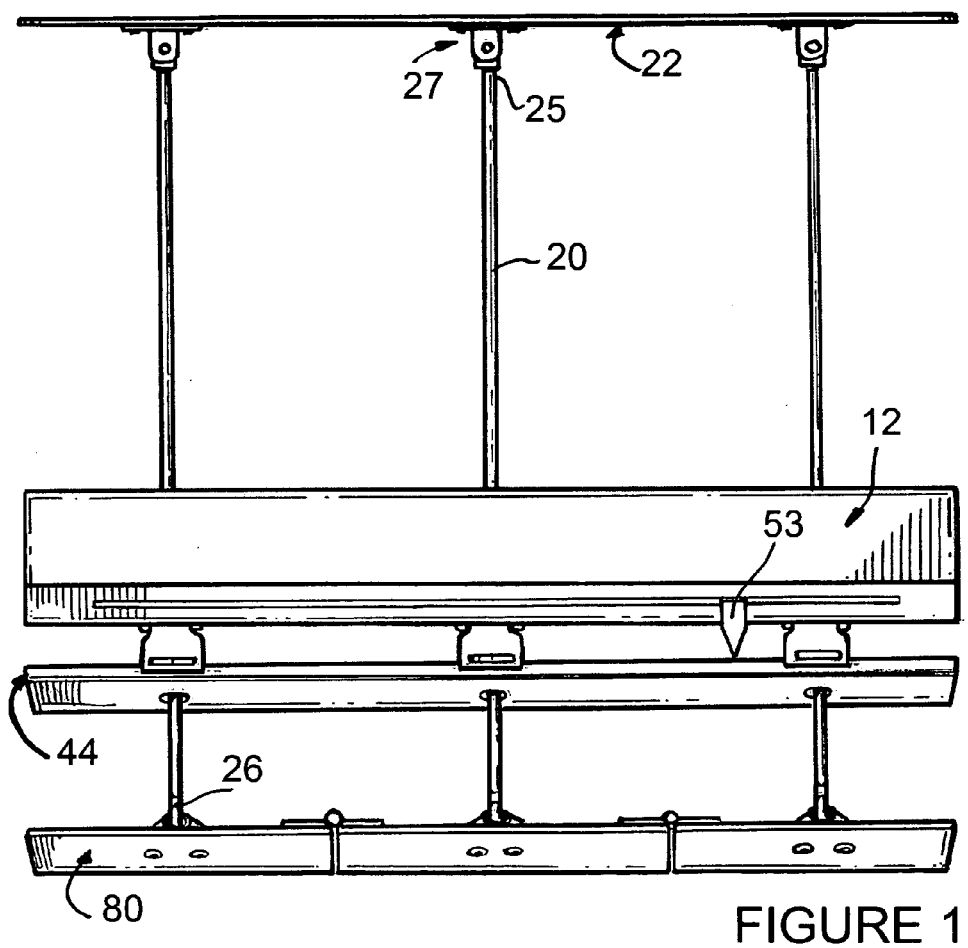
FIG. 11, is a top view of the tile measuring device of FIG. 1.
Figure 12:
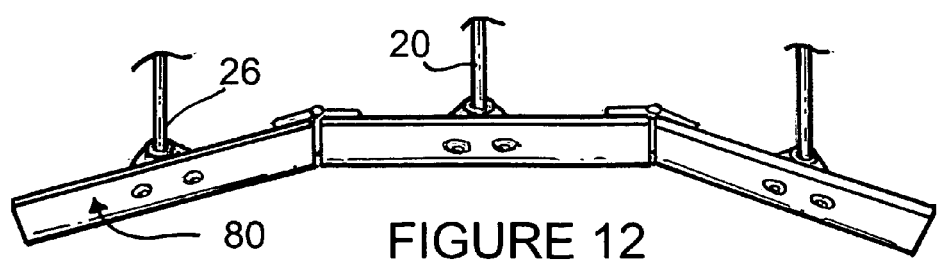
FIG. 12 is a top view of a compliant coupling member of the tile measuring device of FIG. 1.

Turning now to FIG. 11, a top view of tile measuring device 10 is illustrated. As stated previously, flexible contact bar 22 is pivotally supported on ends 25 of shafts 20 and movable relative reference bar member 12. Flexible contact bar 22 conforms to the shape of an obstruction by the relative extension of rods 22. As can be seen with reference to FIG. 10, flexible contact bar 22 forms a curve by the greater extension of the middle shaft 20 when compared to the adjacent shafts 20. When a compliant coupling member 80 is employed coupling ends 26 of shafts 20, the shape of compliant coupling member 80 alters to accommodate the relative positions of shafts 20, as illustrated in FIG. 12. Marker 53 is positioned to indicate an edge of a laid tile next to which I tell to be cut is being measured. In this manner the shape of flexible contact bar 22 at the appropriate location can be aligned with the tile to be cut.

Various changes and modifications to the embodiments herein chosen for purposes of illustration will readily occur to those skilled in the art. As an example, shafts 20 may be foldable, such as by locking hinges and the like, to permit tile measuring device 10 to be folded down into a more compact unit for transport. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A tile measuring device comprising:
   a reference bar member having a bottom side;
   a plurality of shafts extending through the reference bar member and terminating in a flexible contact bar, the plurality of shafts independently slidable through the reference bar member; and
   a gap gauge carried by the bottom side of the reference bar member.

2. A tile measuring device as claimed in claim 1 further including a braking mechanism releasably locking the plurality of shafts into position relative the reference bar member.

3. A tile measuring device as claimed in claim 1 wherein the gap gauge is removably attached to the bottom side of the reference bar member.

4. A tile measuring device as claimed in claim 1 wherein the gap gauge includes a flat vertical surface on a first side and a stepped surface on a second, opposing side.

5. A tile measuring device as claimed in claim 1 wherein the plurality of shafts terminating in the flexible contact bar further including a pivoting coupling, coupling the shafts to the flexible contact bar.

6. A tile measuring device as claimed in claim 1 further including the shafts each having an end opposite the flexible contact member, and a compliant coupling member coupling the ends of the shafts.

7. A tile measuring device comprising:
a reference bar member having a bottom side, a top side, a front side, and a rear side;
a plurality of shafts extending through the reference bar member from the rear side to the front side and independently reciprocally movable therethrough;
each shaft of the plurality of shafts includes a first end and a second end;
a flexible contact bar having a front surface and a rear surface, the first end of each shaft of the plurality of shafts being coupled to the rear surface of the flexible contact member;
a braking mechanism releasably locking the plurality of shafts into position relative the reference bar member; and
a gap gauge carried by the bottom side of the reference bar member.

8. A tile measuring device as claimed in claim 7 wherein the gap gauge is removably attached to the bottom side of the reference bar member.

9. A tile measuring device as claimed in claim 8 wherein the gap gauge is removably slidable into a slot formed in the bottom side of the reference bar member.

10. A tile measuring device as claimed in claim 7 wherein the gap gauge includes a flat vertical surface on a first side and a stepped surface on a second, opposing side.

11. A tile measuring device as claimed in claim 7 wherein the first end of each shaft of the plurality of shafts coupled to the rear surface of the flexible contact member is coupled by a pivoting coupling.

12. A tile measuring device as claimed in claim 7 further including each shaft of the plurality of shafts having a second end coupled together by a compliant coupling member.

13. A method of measuring a tile comprising the steps of:
providing a laid tile having an edge, and a space between the edge of the laid tile and an obstruction;
providing a tile measuring device including:
a reference bar member having a bottom side, a top side, a front side, and a rear side;
a plurality of shafts extending through the reference bar member from the rear side to the front side and independently reciprocally movable therethrough;
each shaft of the plurality of shafts includes a first end and a second end;
a flexible contact bar having a front surface and a rear surface, the first end of each shaft of the plurality of shafts being coupled to the rear surface of the flexible contact member;
a braking mechanism movable between a locked orientation for locking the plurality of shafts into position relative the reference bar member and an unlocked orientation for allowing reciprocal movement of the plurality of shafts relative the reference bar member; and
a gap gauge carried by the bottom side of the reference bar member, the gap gauge having a rearward surface and a forward surface;
positioning the tile measuring device with the rearward surface of the gap gauge against the edge of the laid tile;
moving each shaft of the plurality of shafts forwardly until the flexible contact member presses against and conforms to the obstruction;
moving the braking mechanism to the locked orientation.

14. A method as claimed in claim 13 further including the step of:
removing the tile measuring device from the laid tile;
placing the tile measuring device over a tile to be cut with the forward surface of the gap gauge residing against an edge thereof; and
using the flexible contact member as a tracing guide on the tile to be cut.

15. A method as claimed in claim 14 wherein the forward surface of the gap gauge includes a plurality of steps and the method further comprises the step of selecting a step of the plurality of steps and placing the tile measuring device over a tile to be cut with a forward surface of the selected step residing against an edge of the tile to be cut.

16. A method as claimed in claim 13 wherein the step of moving each shaft of the plurality of shafts forwardly until the flexible contact member presses against and conforms to the obstruction includes providing that the first end of each shaft of the plurality of shafts coupled to the rear surface of the flexible contact member is coupled by a pivoting coupling.

17. A method as claimed in claim 13 wherein the step of moving each shaft of the plurality of shafts forwardly until the flexible contact member presses against and conforms to the obstruction further includes the steps of:
providing each shaft of the plurality of shafts with a second end coupled together by a compliant coupling member; and
moving the compliant member to move the plurality of shafts.

* * * * *